United States Patent [19]

Wall

[11] 4,109,954
[45] Aug. 29, 1978

[54] EXPANDABLE CAMPER APPARATUS

[76] Inventor: Richard E. Wall, 3701 E. Poinsettia Dr., Phoenix, Ariz. 85028

[21] Appl. No.: 744,731

[22] Filed: Nov. 24, 1976

[51] Int. Cl.² .............................................. B60P 3/30
[52] U.S. Cl. .................................. 296/23 A; 135/1 A
[58] Field of Search .................. 296/23 A, 23 G, 26, 296/24; 135/1 A, 3 A, 4 A

[56] References Cited

U.S. PATENT DOCUMENTS

| 1,280,841 | 10/1918 | Reid | 296/23 A |
| 2,784,027 | 5/1957 | Temp | 296/26 |
| 2,815,762 | 12/1957 | Smith | 135/1 A |
| 3,724,893 | 4/1973 | Giroux | 135/4 A |

*Primary Examiner*—Philip Goodman
*Attorney, Agent, or Firm*—Martin L. Stoneman

[57] ABSTRACT

An expandable camper apparatus for use with a pick-up truck, the apparatus including a false floor for the pick-up bed with storage space therebeneath in which is stored a hinged, foldable floor member for a tent. To use the apparatus, the floor member is essentially removed from the pick-up bed, unfolded, and becomes the floor of a large tent constructed adjacent to the rear of the pick-up truck.

3 Claims, 8 Drawing Figures

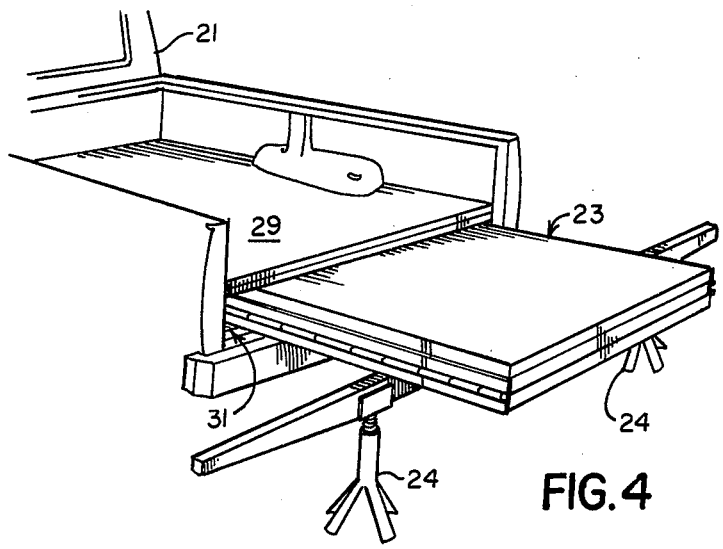
FIG. 4
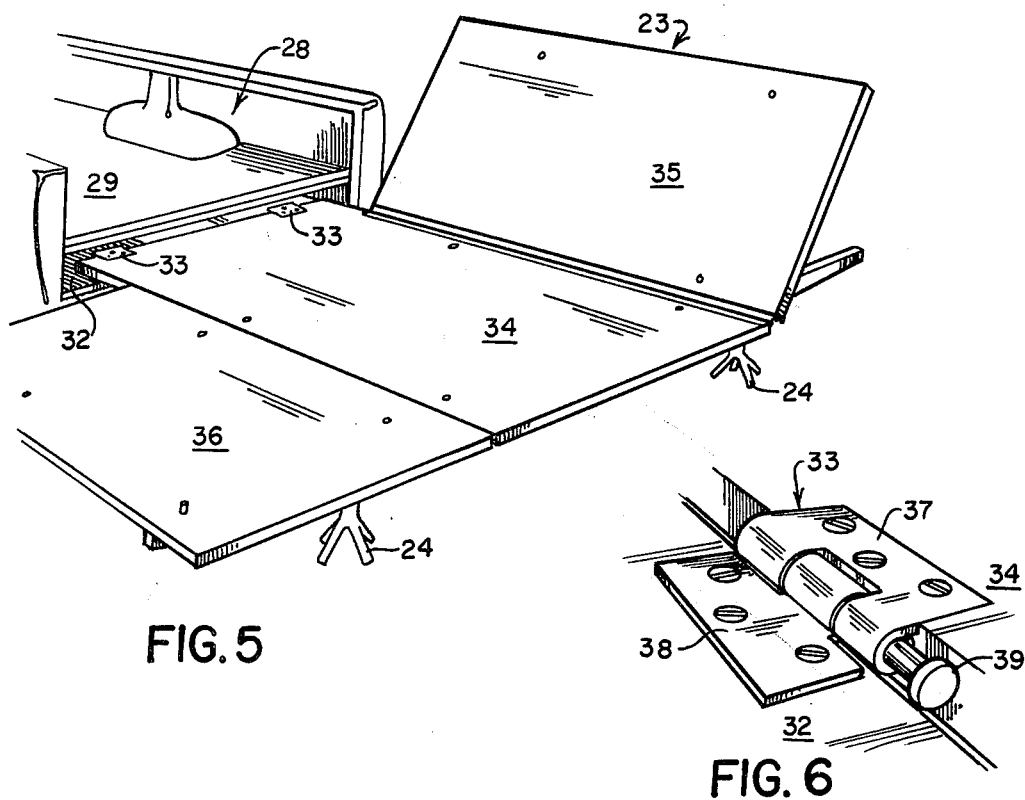
FIG. 5
FIG. 6

EXPANDABLE CAMPER APPARATUS

BACKGROUND OF THE INVENTION

This invention relates to expandable campers.

More particularly, the invention concerns an expandable camper apparatus for use with a pick-up truck.

In a further aspect, the invention concerns an expandable camper apparatus which includes a foldable floor member (for a tent) which is stored in its folded position underneath a false floor of the pick-up bed.

In the past, the useable area of a camper, most often a pick-up utility vehicle, has been limited to the size of the bed of the truck, with some overhang possible. On some present campers, it is possible to raise and lower the roof and expand the sides. Furthermore, except for shell campers, i.e., mere covers over the pick-up bed, most campers presently lose cargo capacity and utility for ordinary use.

Furthermore, except for shell campers, most present campers are very heavy and require heavy-duty vehicles or extra suspension systems and special tires.

It would be highly advantageous, therefore, to provide for an expandable camper which is not only adapted for simplicity in construction and floor expansion greatly beyond the size of the truck bed, but provides also for the solution of the other problems hereinbefore mentioned with respect to the prior art.

SUMMARY OF THE INVENTION

Accordingly, it is the primary object of the present invention to provide an improved apparatus for expandable campers.

Another object of the present invention is the provision of an expandable camper apparatus which is lightweight and may be expanded in many directions.

Still another object is to provide an expandable camper apparatus which leaves the interior of the camper substantially intact for utility and cargo purposes when not being used for recreational purposes.

Yet another object of the present invention is the provision of an expandable camper apparatus of the above type which allows storage under a false floor.

Even another object is to provide an expandable camper apparatus in which the expanded portion can be disconnected and reconnected to the vehicle.

Yet still another object of the present invention is the provision of an expandable camper apparatus of the above type which is efficient in its manner of operation, relatively inexpensive to manufacture, and having a high degree of durability and servicability.

Briefly, to accomplish the desired objectives of the present invention in accordance with the presently preferred embodiment thereof, there is provided an expandable camper apparatus for use with a pick-up truck. The apparatus includes a false floor or platform mounted on the pickup bed and extending above and parallel to the pick-up bed. The platform has a storage space underneath the false floor portion and above the pick-up bed. A foldable floor member in its folded state is stored in the storage space and slidably mounted for entry and exit from the storage space from the rear of the pick-up truck. This foldable floor member consists of multiple panels hingedly connected in the direction of the long axis of the pick-up bed. The apparatus includes tent frame members for construction and placement upon the foldable floor member when it is in its unfolded state, i.e., when it is removed from the storage space, and opened to make a flat floor member to receive the tent frame members. The tent frame members are adapted to support tenting materials thereupon to provide a tent which may be either connected or disconnected to the camper vehicle. The apparatus further includes multiple height adjustable support members or stanchions for elevating the foldable floor member when in its unfolded state to a selected height, most normally the height of the floor of the pick-up bed.

BRIEF DESCRIPTION OF THE DRAWINGS

Further and more specific objects and advantages of the present invention will become readily apparent to those skilled in the art from the following detailed description thereof taken in connection with the drawings, in which:

FIG. 4 is a perspective view illustrating the foldable floor member of the present invention pulled out sufficiently from the storage space of the present invention to allow the use of height-adjustable support members thereunder;

FIG. 5 is a perspective view similar to FIG. 4 except showing the foldable floor member removed from its storage space to its greatest extension and being unfolded atop the height-adjustable support members of the present invention;

FIG. 6 is an enlarged view in perspective illustrating the hinge arrangement between the foldable floor member and the pick-up truck;

DETAILED DESCRIPTION OF THE PREFERRED EMBODIMENT

Figure 1:
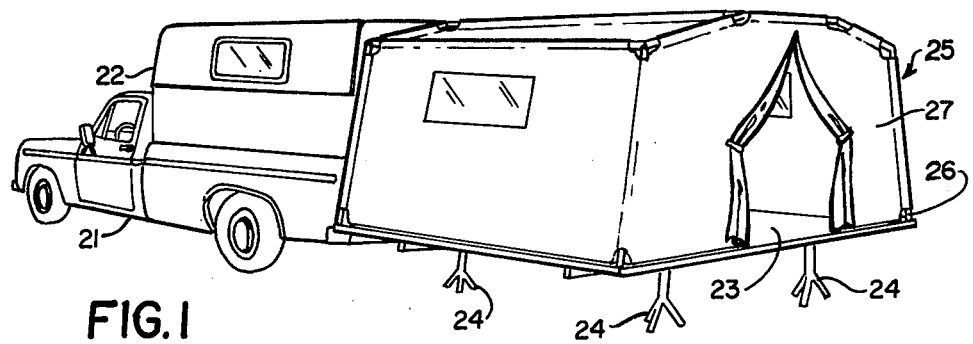
FIG. 1 is an artistic view in perspective of the preferred embodiment of the expandable camper apparatus of the present invention, shown with all parts set up for its fully expandable use in connection with the pick-up truck and shell camper.

Turning now to the drawings, in which the reference numerals indicate corresponding elements throughout the several views, FIG. 1 illustrates the results when the presently preferred apparatus of the present invention is used. Illustrated are pick-up truck 21, shell camper 22, foldable floor member 23, height-adjustable support members 24, and tent 25 mounted on foldable floor member 23. The tent 25 is constructed of frame members 26 supporting tenting material 27. The tenting material 27 may be placed in conventional ways to butt up against the shell camper and enclose the entire expanded area.

Figure 2:
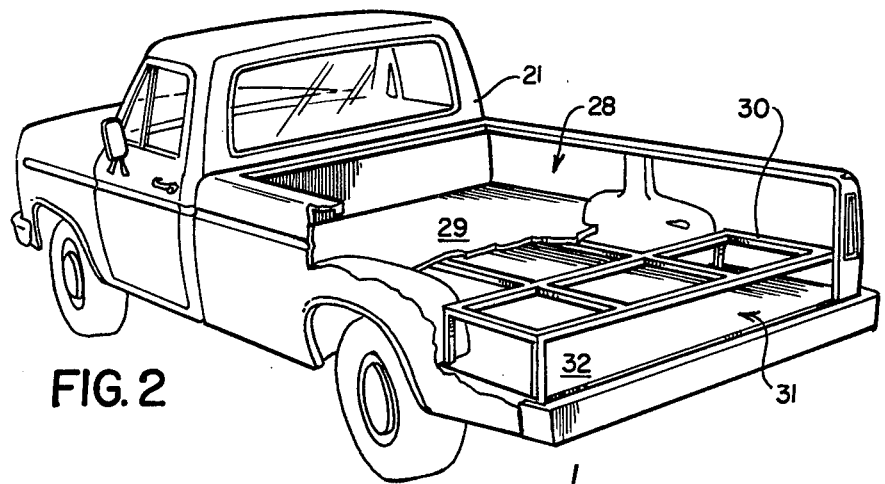
FIG. 2 is an artistic view in perspective of the platform or false floor member of the illustrated preferred embodiment of the present invention, showing the same in position on a pick-up bed, partially broken away to better illustrate on preferred construction.

With particular reference to FIG. 2, pick-up 21 truck having pick-up bed 28 is illustrated. Platform or false floor 29 is shown in place in pick-up bed 28. Platform support structure 30 is shown in breakaway and supports platform 29. Storage space 31 is seen to be located between platform 29 and the floor 32 of pick-up bed 28.

Figure 3:
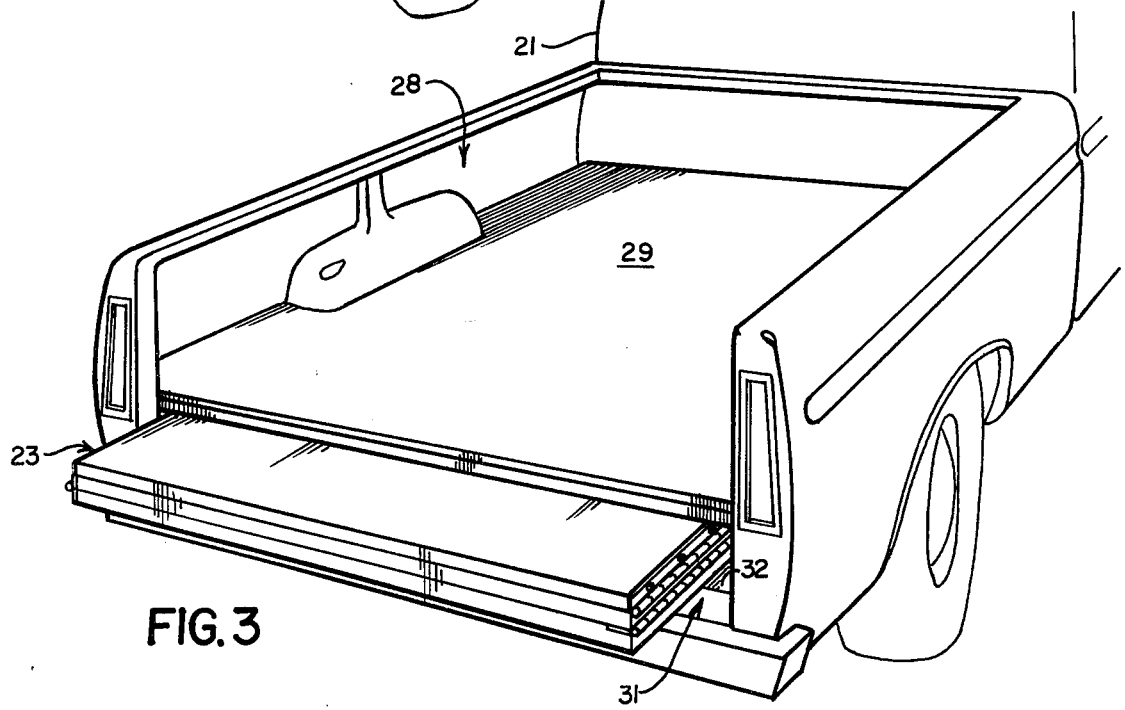
FIG. 3 is an artistic view in perspective illustrating the foldable floor member of the present invention to show its entry and exit from the storage space of the present invention.

With particular reference to FIG. 3, the rear of pick-up truck 21 is shown. Platform 29 is in place and is a false floor for the pick-up bed 28. Shown located in storage space 31 is foldable floor member 23 in its folded state, shown partially out of its storage space 31. Foldable floor member 23 is slidably mounted in conventional ways on floor 32 of pick-up bed 28.

With particular reference to FIG. 4, foldable floor member 23 is now seen in a position partially removed from storage space 31 and foldable floor member 23 is shown supported by height-adjustable support members 24, which may be of conventional types.

With particular reference to FIG. 5, the pick-up bed 28 is shown with foldable floor member 23 entirely extended therefrom except for its hinged attachment with the floor 32 of pick-up bed 28 by way of hinges 33. Foldable floor member 23 consists of a center panel 34, a righthand panel 35, and a lefthand panel 36. Left-hand panel 36 is shown in its final position fully unfolded and resting upon height adjustable support member 24. Right-hand panel 35 is shown partially unfolded and on the way to its final position opposite and in line with panel 36. It will be seen by those skilled in the art, at this point, with reference to FIG. 1, that foldable floor member 23 in its unfolded state will function as a floor for tent 25.

With particular reference to FIG. 6, an enlarged view of a hinge 33 is shown. Hinge 33 consists of upper hinge part 37, which is a fixed in a conventional manner to center panel 34 of foldable floor member 23, lower hinge part 38 which is affixed in a conventional manner to the floor 32 of pick-up bed 28, and removable hinge pin 39. It is seen that foldable floor member 23 can be connected or disconnected at will in a hinged manner merely by the removable and insertion as desired of removable hinge pin 39 in a conventional manner.

Figure 7:
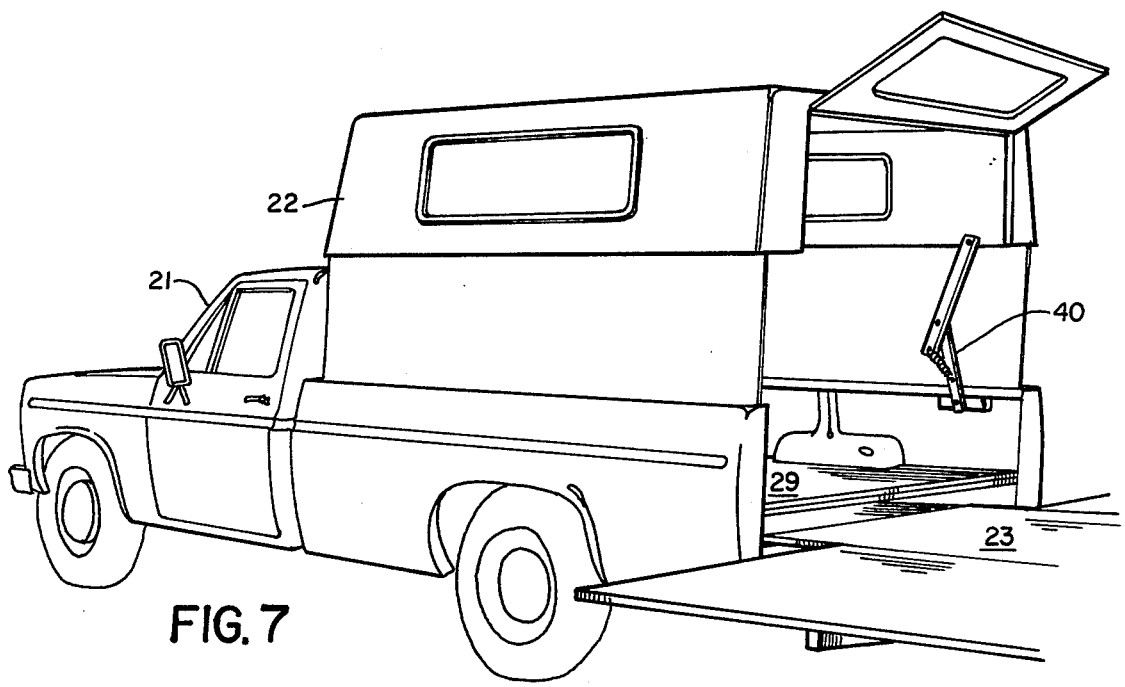
FIG. 7 is an artistic view in perspective of the preferred embodiment of both the lifter mechanism of the present invention shown in connection with a shell camper and the extended foldable floor member of the present invention.

With particular reference to FIG. 7, there is shown an enlarged view of pick-up truck 21 and shell camper 22. Shell camper 22 is shown in an elevated position and normally occupies a lower position more nearly adjacent pick-up bed 28. The shell camper 22 is shown as having been raised by lifter mechanism 40, of a conventional type (such as spring-loaded hinged folding arms or telescoping lifters raised by wench, electrically or hydraulically).

Figure 8:
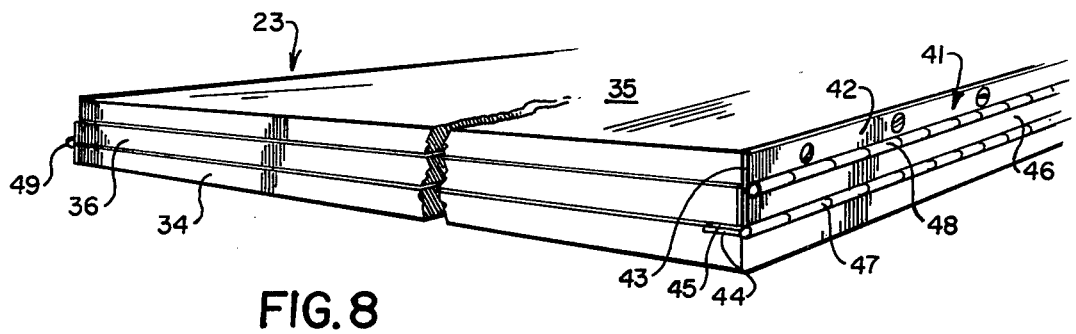
FIG. 8 is a partial perspective view of a preferred embodiment of the foldable floor member of the present invention, especially illustrating the hinge arrangement between the panels thereof.

With particular reference to FIG. 8, there is shown more clearly the hinge attachements between the panels 34, 35 and 36 making up the foldable floor member 23. The hinge attachment 41 between panels 34 and 35 is a double hinge construction consisting of upper hinge member 42 attached in a conventional way to panel 35 at 43, lower hinge member 44 attached to panel 34 at 45 in a conventional way and center member 46 connecting the double hinge and attached only to hinge pins 47 and 48. It is seen that this double hinge arrangement allows right hand panel 35 to open and come to rest in line with and closely adjacent (with slight spacing) with center panel 34 and then panel 36 may open around conventional hinge 49 and similarly come to rest adjacent and in line with center panel 34.

Thus it is seen that the expandable camper apparatus of the present invention enables the utilization of a pick-up, preferably with shell camper, to expand from its original dimension within the wheel wells, tailgate, and front of the bed of the pick-up to three times or more of the original floor area of the camper. Further it is seen, by reason of the apparatus of the present invention, such expansion, by reason of the foldable floor member of the present invention, may be enabled with apparatus stored conveniently under the floor of the pick-up bed and thus enable the user not to lose the utility of the pick-up for cargo. It is further seen that the height-adjustable support members of the present invention may be stored within storage space 31 either in front of or aft of the wheel wells of the pick-up truck, or both. Further it is seen that an extremely largely tent may be constructed upon the foldable floor member of the present invention and that, in such expanded position, the tent can be disconnected from the truck bed and be left in a stationary position, free standing.

Various changes in the device herein shown for the purpose of illustration will readily occur to persons skilled in the art. Such modifications and variations, while not explictly denoted in the foregoing detailed description of the preferred embodiment, do not deviate from the teachings of the present invention and are intended to be included in the spirit and scope thereof, and the scope of the present invention is intended to be limited only by a fair interpretation of the following claims.

I claim:

1. Apparatus for use with a pick-up truck having a pick-up bed, said apparatus including:
   (a) a platform constructed and arranged to extend above and parallel to said pick-up bed and having a storage space therebelow and above said pick-up bed;
   (b) a foldable floor member constructed and arranged for storage in said storage space in its folded state and being slidably mounted for entry and exit from said storage space from the rear of said pick-up truck;
   (c) said foldable floor member comprising three panels, a middle one of said panels having hinges on both of its sides connected and arranged with the others of said panels so that a second of said panels folds flat against said middle panel and the third of said panels folds flat against said second panel on axes in the direction of the long axis of said pick-up bed, all of said panels presenting a flat floor when unfolded; and
   (d) tent frame members constructed and arranged for placement upon said foldable floor member and adapted to receive tenting materials when said foldable floor member is in its unfolded state.

2. The apparatus of claim 1 including height-adjustable support means constructed and arranged for supporting said flat floor member to a selected height.

3. Apparatus for use with a pick-up truck having a pick-up bed, said apparatus including:
   (a) a platform constructed and arranged to extend above and parallel to said pick-up bed and having a storage space therebelow and above said pick-up bed;
   (b) a foldable floor member constructed and arranged for storage in said storage space in its folded state and being slidably mounted for entry and exit from said storage space from the rear of said pick-up truck;
   (c) said foldable floor member comprising multiple panels hingedly connected and constructed and arranged, when in its unfolded state, to comprise a flat floor member.
   (d) a mechanical quick-disconnect means between said foldable floor member and said truck.

* * * * *